United States Patent [19]

Ohiwa et al.

[11] Patent Number: 4,835,701

[45] Date of Patent: May 30, 1989

[54] POST-MIX METHOD AND SYSTEM FOR SUPPLY OF POWDERIZED MATERIALS

[75] Inventors: Yoshitaka Ohiwa; Shyoichi Hiwasa; Hideo Take, all of Okayama, Japan

[73] Assignee: Kawasaki Steel Corp., Tokyo, Japan

[21] Appl. No.: 40,346

[22] Filed: Apr. 20, 1987

[51] Int. Cl.$^4$ .............................................. C21B 5/00
[52] U.S. Cl. .................................. 364/477; 364/502; 364/479; 366/134; 266/82
[58] Field of Search ............... 364/502, 477, 478, 479; 266/80, 81, 82, 83; 137/3, 88; 366/132, 134, 152

[56] References Cited

U.S. PATENT DOCUMENTS

| | | | |
|---|---|---|---|
| 3,920,447 | 11/1975 | Schroeder et al. | 266/83 |
| 4,136,857 | 1/1979 | Kolb | 266/80 |
| 4,353,482 | 10/1982 | Tomlinson et al. | 364/479 |
| 4,363,470 | 12/1982 | Ives | 266/80 |
| 4,525,071 | 6/1985 | Horowitz et al. | 366/152 |
| 4,613,113 | 9/1986 | Saito et al. | 266/83 |

*Primary Examiner*—Allen MacDonald
*Attorney, Agent, or Firm*—Austin R. Miller

[57] ABSTRACT

A powderized material supply system comprises a plurality of reservoir tanks, each containing a different type of powder, and is associated with a metering means for metering the material into an individual supply line. Each individual supply line is associated with a carrier fluid source which supplies, carrier fluid at a controlled pressure for transferring the metered material with the carrier fluid. The individual material suppply lines, each associated with the corresponding reservoir tank, are connected to a post-mixing chamber into which the metered materials are introduced. The post-mixing chamber is connected to a mixture supply line. Each metering means can be controlled for metering a controlled amount of the material in its associated reservoir tank, independently of others. The powderized material supply system is applicable in various industrial or laboratory level processes which require supply of a plurality of powder state fluid material at a variable rate. The system is specifically applicable for flux injection in hot metal pre-treatment process in smelting process of metal industries. For example, the system is applicable for sequential operation or simultaneous operation for desiliconization, dephosphorization and/or desulfurization during hot metal pre-treatment.

37 Claims, 9 Drawing Sheets

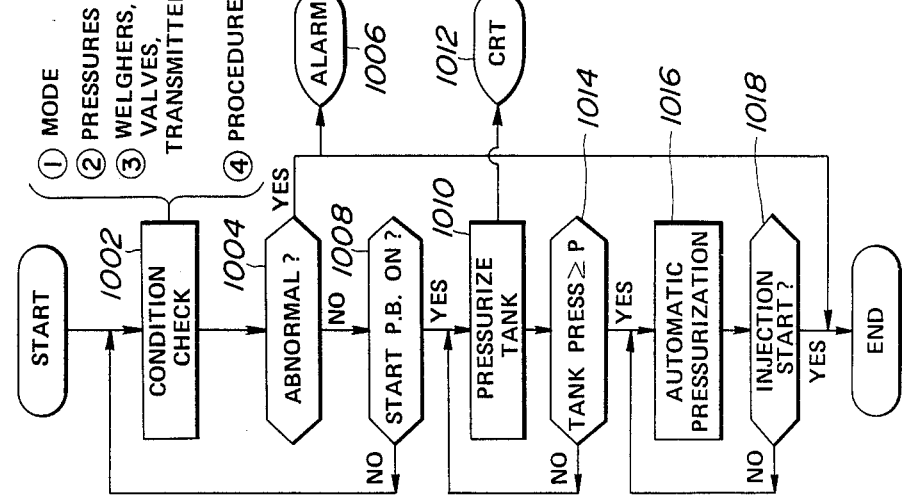
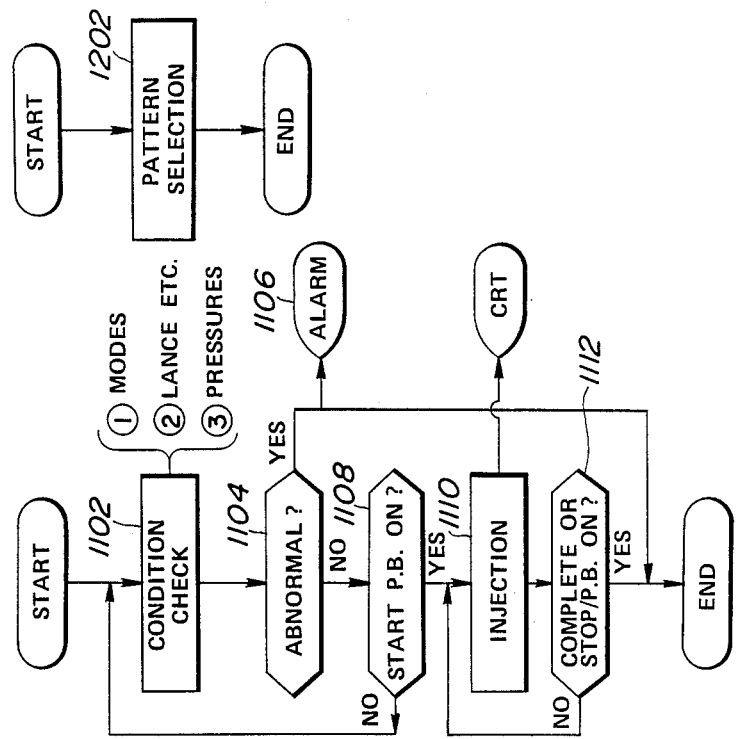
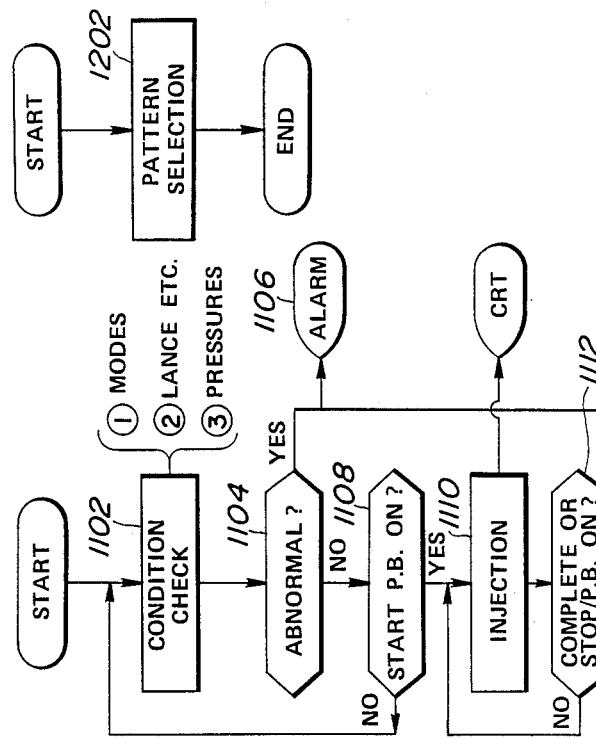

POST-MIX METHOD AND SYSTEM FOR SUPPLY OF POWDERIZED MATERIALS

BACKGROUND OF THE INVENTION

1. Field of the Invention

The present invention relates generally to a method and system for supplying a plurality of powderized materials in a mixed form. More specifically, the invention relates to a system for post-mixing a plurality of separate powderized materials transported via a carrier fluid in which mixing ratio and flow rate can be controlled. The invention also relates to a post-mix flux injection in a smelting process.

2. Description of the Background Art

As is well known, various powderized materials have to be introduced in smelting processes. For instance, coal injection has to be performed for a blast furnace, a flux injection must be performed into a LD converter and a plurality of fluxes are injected during hot metal pre-treatment. In the known processes of hot metal pre-treatment, fluxes for desiliconization, dephosphorization and desulfurization are used. Such hot metal pre-treatment processes are usually performed in torpedo cars or so forth. Conventionally, the hot metal pre-treatment process is separated into a desiliconization stage, a dephosphorization stage and a desulfurization stage. In the process stages, desiliconization agent, dephosphorization agent and desulfurization agent are injected. Since the desiliconization agent, deposphorization agent and desulfurization agent have respectively different compositions, it has been difficult to establish different composition of the agents from materials supplied from a common source. In this connection, the mutually different composition of agents are prepared into a post-mix and stored in reservoirs at different positions. During such hot metal pre-treatment processing, the torpedo cars have to travel along a processing line for performing different stages of pre-treatment. Flux injection at desiliconization stage, dephosphorization stage and desulfurization stage all have been disclosed in the Japanese Utility Model Second (examined) Publication (Jikko) No. Showa 57-21032, published on, and the Japanese Patent First (unexamined) Publication (Tokkai) No. Showa 57-67422, for example. Each of these publications discloses a flux injection system comprising a single flux reservoir tank and a single lance. The flux in the powder stage is carried with a gaseous state carrier fluid at a controlled rate.

Such conventional hot metal pre-treatment processes are inconvenient, since they require travelling of the torpedo cars from one stage to the next stage. Furthermore, at every stage, a slag-off operation is required. Such necessities make the hot metal pre-treatment process inefficient.

SUMMARY OF THE INVENTION

Therefore, it is an object of the present invention to provide a novel and highly efficient powderized material supply system which enables a plurality of powderized materials to be supplied in a post-mixed form.

Another object of the invention is to provide a system which allows variation of the supply rate of one or more of the powderized materials during the post-mix and supply operation.

A further object of the invention is to provide a post-mix flux injection system which is applicable in smelting processes, particularly for hot metal pre-treatment processes.

In order to accomplish the aforementioned and other objects, a powderized material supply system, according to the present invention, comprises a plurality of reservoir tanks, each containing a different type of powder, and is associated with a metering means for metering the material into an individual supply line. Each individual supply line is associated with a carrier fluid source which supplies carrier fluid at a controlled pressure for transferring the metered material with the carrier fluid. The individual material supply lines, each associated with the corresponding reservoir tank, are connected to a confluence means into which the metered materials are introduced. The post-mixing chamber is connected to a mixture supply line. Each metering means can be controlled for metering a controlled amount of the material in its associated reservoir tank, independently of others.

Although the powderized material supply system of the present invention, as set forth above, is applicable in various industrial or laboratory level processes which require supply of a plurality of powder state fluid material at a variable rate, the system is specifically applicable for flux injection in hot metal pre-treatment process in smelting process of metal industries. For example, the system is applicable for sequential operation or simultaneous operation for desiliconization, dephosphorization and/or desulfurization during hot metal pre-treatment.

According to one aspect of the invention, a system for supplying a plurality of mutually different powder state materials at a controlled supply rate in post-mixed form, comprises a plurality of tanks, each being filled with one of the powder state materials, a metering means associated with each of the tanks for metering powder state material to supply a controlled amount of the materials, a feeding means, including a plurality of supply lines, each of which is associated with one of the tanks for feeding the metered material from the associated tank by means of carrier fluid flowing therethrough, a confluencing means connected to respective supply lines for receiving materials fed through respective supply lines in order to establish a mixture of the materials, a discharge means, connected to the confluencing means for discharging the mixture established in the confluencing means with a given discharge pressure, and a control means associated with the metering means for controlling operation of the metering means to adjust amounts of respective materials to be contained in the mixture established by the confluencing means at given values, and for controlling carrier fluid pressure to be introduced into the feeding means based on the given discharge pressure.

The control means controls each of the metering means for varying the supply rate of the material in an associated tank according to a preset variation pattern which determines the material supply rate variable according to operation period. The control means may also control the feeding means to vary the carrier fluid pressure according to a mass flow rate of the mixture to be discharged through the discharge means.

The system further comprises means for introducing a pressurized fluid into respective tanks to maintain internal pressures in respective tanks at a given pressure, and tank pressure sensors, each associated with one of the tanks for monitoring internal pressure in the associated tank for producing a tank pressure indicative signal. The control means is associated with the pressurized fluid introducing means for controlling tank pressure on the basis of the tank pressure indicative signal. The control means derives required tank pressure on the basis of the required mass flow rate of the materal in each tank to control the pressurized fluid introducing means to adjust the internal pressure in each tank toward the required pressure. The pressurized fluid introducing means and the feeding means are connected to a common pressurized fluid source.

The metering means comprises a plurality of rotary feeders, each associated with one of the tanks for metering controlled amount of material in the associated tank. The control means is adapted to control respective rotary feeders for adjusting the material supply rate independently of each other.

Preferably, the control means comprises a computer based controller including a memory storing a plurality of mutually distinct variation patterns and a manual selector means for manually selecting one of material injection patterns. The memory stores combined variation patterns for respective materials so that variation patterns for all of materials can be selected through the manual selector means by identifying one combined pattern.

The confluencing means preferably comprises a confluence pipe defining a mixing chamber therein and having a plurality of branched pipes respectively connected to the supply lines for introducing materials fed through the supply lines with the carrier fluid into the mixing chamber for establishing the mixture. In the preferred construction, the confluence pipe further comprises means for introducing a pressurized gas substantially perpendicular to the flow direction of the materials as carried by the carrier fluid. The confluence pipe may further comprise a cylindrical partition disposed within the mixing chamber to define a substantially annular chamber around the mixing chamber, the partion being formed with a plurality of apertures establishing gas communication between the mixing chamber and the annular chamber, and the pressurized gas is discharged into the annular chamber and blown into the mixing chamber through the apertures formed in the partition.

The pressure of the pressurized gas to be introduced into the mixing chamber is adjusted to be slightly higher than the pressure in the mixing chamber.

According to another aspect of the invention, a system for supplying a plurality of mutually different fluxes to be utilized for hot metal pre-treatment in a smelting process, in a post-mixed form, comprises a plurality of tanks, each being filled with one of the powder state fluxes, a metering means associated with each of the tanks for metering powder state flux to supply a controlled amount of the fluxes, a feeding means, including a plurality of supply lines, each of which is associated with one of the tanks for feeding the metered flux from the associated tank by means of carrier fluid flowing therethrough, a confluencing means, connected to respective supply lines, for receiving fluxes fed through respective supply lines in order to establish a mixture of the fluxes, a discharge means connected to the confluencing means for discharging the mixture established in the confluencing means into a molten metal in a hot metal container with a given discharge pressure, and a control means associated with the metering means for controlling operation of the metering means to adjust amounts of respective fluxes to be contained in the mixture established by the confluencing means at given values, and for controlling carrier fluid pressure to be introduced into the feeding means based on the given discharge pressure.

The hot metal container is a torpedo car. The fluxes filled in the tanks are forms at least two of desiliconization agent, dephosphorization agent and desulfurization agent.

The discharge means comprises an injection lance to be inserted into the hot metal and an injection line connecting the injection lance to the confluencing means.

According to a further aspect of the invention, a method for supplying a plurality of mutually different powder state materials at a controlled supply rate in post-mixed form, comprises the steps of:

metering mutually different powder state materials from a plurality of mutually different sources to supply a controlled amount of the materials;

feeding the metered material from the sources by means of carrier fluid flowing through mutually independent supply lines;

forming a mixture of materials fed through the supply lines;

discharging the mixture with a given discharge pressure; and controlling the metering amounts of respective materials to be contained in the mixture in order to adjust mixture rates of respective materials according to a preset variation pattern in relation to operation period, and for controlling carrier fluid pressure to be introduced into the supply lines based on the given discharge pressure.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings:

FIGS. 12(A) to 12(C) are flowcharts showing a sequence of a flux injection control program to be executed by a control unit in the practical embodiment of the hot-metal pre-treatment system as shown in FIG. 9;

DESCRIPTION OF THE PREFERRED EMBODIMENT

Figure 1:
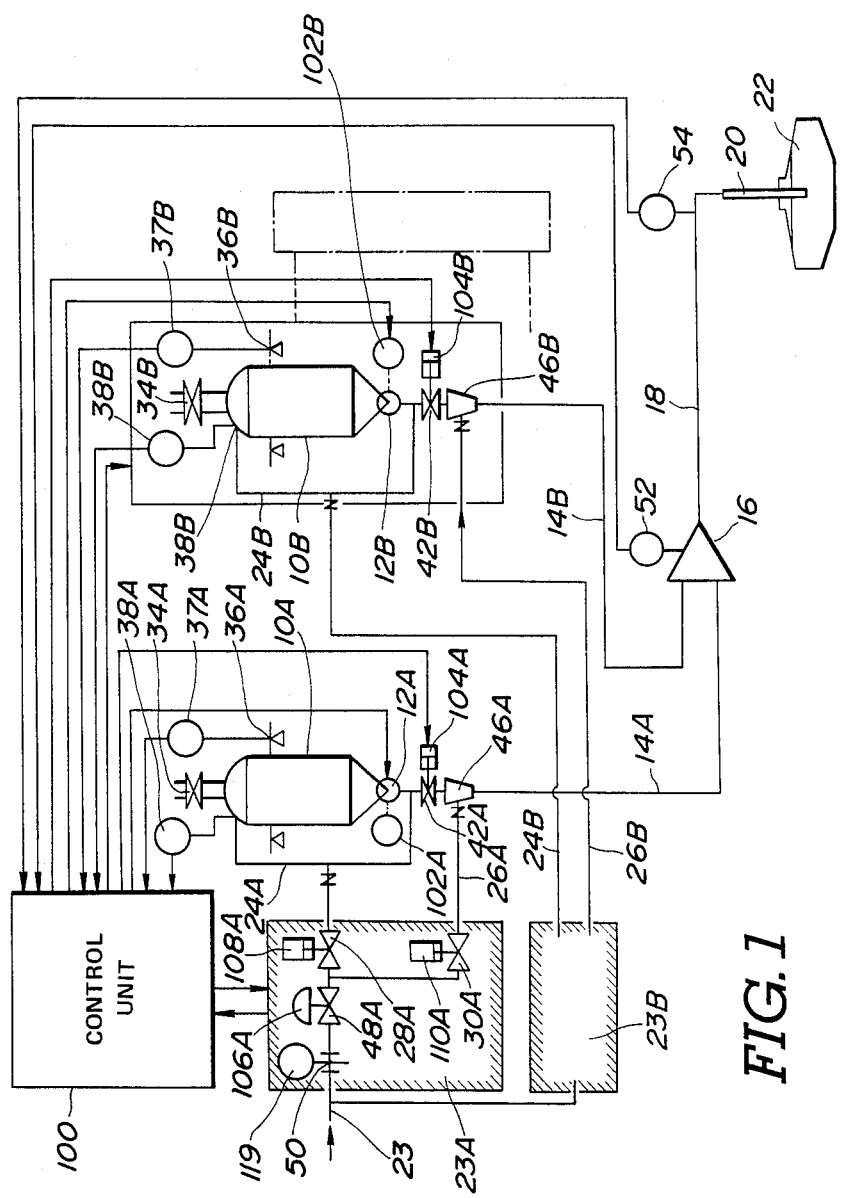
FIG. 1 is a schematic diagram showing a preferred embodiment of a powderized material supply system according to the invention.
Figure 2:
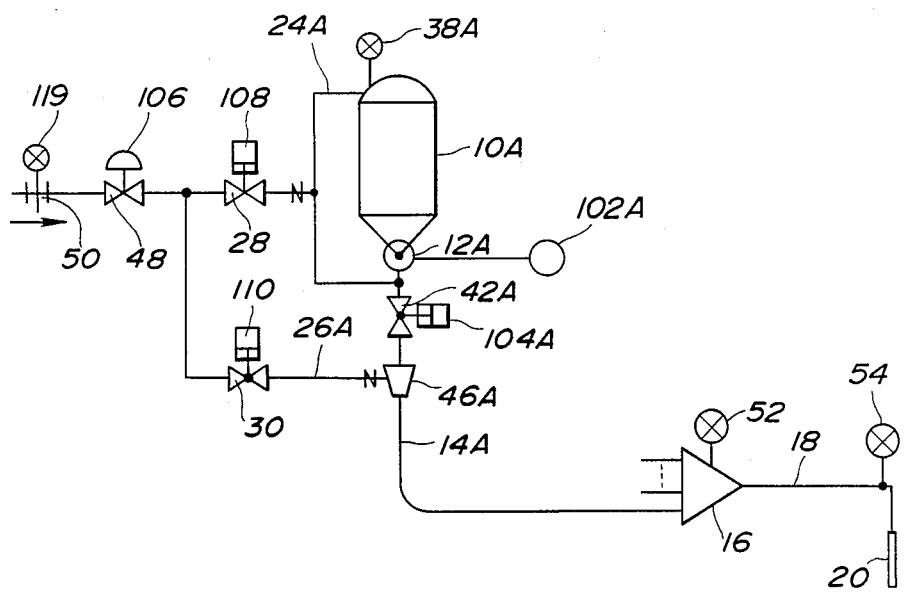
FIG. 2 is a partial diagram of the powderized material supply system of FIG. 1, in which a single powder supply circuit is illustrated.

Referring now to the drawings, particularly to FIG. 1 and 2, the fundamental construction of the preferred embodiment of a powder state material supply system according to the invention is illustrated. Though FIG. 1 illustrates the powderized material supply system employing two powderized material reservoir tanks 10A and 10B and associated supply lines 14A and 14B for supplying two different types of powderized material, it should be possible to employ more than two tanks and associated supply lines.

As shown in FIG. 1, the powderized material reservoir tanks 10A and 10B are connected to material supply sources, such as hoppers (not shown) through material supply lines with material supply control valves 34A and 34B. The reservoir tanks 10A and 10B are associated with rotary feeders 12A and 12B which are cooperative with material metering valves 42A and 42B to serve as metering means for metering a controlled amount of the powderized material into the supply lines 14A and 14B. Respective supply lines 14A and 14B are connected to a confluence pipe 16 in which a material mixing chamber is defined therein. The confluence pipe 16 receives the powderized materials through the supply lines 14A and 14B to mix them in the material mixing chamber to form a mixture of the supplied materials. The mixture is fed through an injection line 18 and injected into a container 22 through an injection nozzle 20.

In order to assist the metering operation of the rotary feeders 12A and 12B, pressurized gas from a pressurized gas source (not shown) is introduced through a pressurized gas supply line 23, valve units 23A and 23B and pressure lines 24A and 24B into respective powder state material reservoir tanks 10A and 10B. On the other hand, the pressurized gas supply line 23 is also connected to the supply lines 14A and 14B through the valve units 23A and 23B and to carrier lines 26A and 26B for introducing the pressurized gas into the supply lines through gas/powder mixers 46A and 46B for circulating the metered powderized material using the pressurized gas as the carrier gas into the confluence pipe 16.

The valve units 23A and 23B are of mutually identical construction. Therefore, in FIG. 1, only the detailed construction of the valve unit 23A is illustrated. As seen from FIG. 1, the valve unit 23A includes a gas flow rate control valve 48, a pressure control valve 28 and a carrier control valve 30. The gas flow rate control valve 48 is adapted to control the gas flow rate through the valve unit 23A. The pressure control valve 28 is disposed in the pressure line 24A for adjusting gas flow to be introduced into the reservoir tank 10A for adjusting internal pressure in the reservoir tank. On the other hand, the carrier control valve 30 is disposed in the carrier line 26 for adjusting the gas flow to be introduced into the supply line 14A for adjusting gas pressure in the supply line and gas and powderized material flow rate.

The valve units 23A and 23B, the rotary feeders 12A and 12B, the metering valves 42A and 42B are connected to a computerized control unit 100 for controlling the operations thereof. The rotary feeders 12A and 12B respectively are associated with driving motors 102A and 102B which are driven according to a feeder control signal $S_f$ from the control unit 100. The metering valves 42A and 42B are associated with valve actuators 104A and 104B which are operated by a metering control signal $S_m$ from the control unit 100 to control the valve position of the associated metering valves. Similarly, the gas flow control valve 48 is associated with a flow control valve actuator 106. The actuator 106 is responsive to a gas flow control signal $S_g$ from the control unit 100 for controlling valve position of the gas flow control valve. The pressure control valve 28 cooperates with a valve actuator 108 which is responsive to a pressure control signal $S_p$ from the control unit 100 for adjusting the position of the pressure control valve and thereby adjusting the pressure in the associated reservoir tank 10A. The carrier control valve 30 also has a valve actuator 110 which is responsive to a carrier control signal $S_c$ for controlling the valve position of the carrier control valve for adjusting gas flow rate through the associated supply line 14A.

On the other hand, the control unit 100 is connected to material weight sensors 36A and 36B. The material weight sensors 36A and 36B may comprise a load cell, for example. The material weight sensors 36A and 36B produce material weight sensor signals. The material weight sensors 36A and 36B are connected to signal generators 37A and 37B which produce material weight indicative signals Wa and Wb to input to the control unit 100 through analog-to-digital (A/D) converter 112A, 112B in an input unit 130. Tank pressure sensors 38A and 38B are also provided for respective reservoir tanks 10A and 10B respectively for monitoring internal pressure therein. The tank pressure sensors 38A and 38B produce tank pressure sensor signals as analog form signals. The tank pressure sensor signals are fed to signal generators 113A and 113B. The signal generators 113A and 113B produce tank pressure indicative signals Pa and Pb to feed via A/D converters 114A and 114B in the input unit 130 to the control unit 100. Similarly, a mixing chamber pressure sensor 52 is adapted to produce a mixing chamber pressure sensor signal. The mixing chamber pressure sensor signal is fed to a signal generator 115. The signal generator 115 outputs a mixing pressure indicative signal $P_{mix}$ be fed to the control unit 100 through an A/D converter 116 of the input unit 130. A back pressure sensor 54 is provided in the injection line 18 immediately upstream of the injection nozzle 20 for monitoring back pressure in the injection line 18. The back pressure sensor 54 produces a back pressure sensor signal. A signal generator 117 receives the back pressure sensor signal to produce a back pressure indicative signal $P_{back}$ to be fed to the control unit 100 through an A/D converter 118. In addition, a gas flow meter 50 is provided in the pressurized gas supply line 23 and upstream of gas flow control valves 48. The gas flow meter 50 produces a gas flow rate sensor signal. The gas flow meter 50 is connected to a signal generator 119 which produces a gas flow rate indicative signal $F_a$ based on the gas flow rate sensor signal. The gas flow rate indicative signal is fed to the control unit 100 through A/D converters 120 in the input unit 130.

Powder supply operation from the reservoir tank 10A to the confluence pipe 16 through the supply line 14A will be described hereinbelow so as to facilitate better understanding of the operation. Since the supply operation to be conducted in the supply line 14B is substantially the same as that in the supply line 14A, discussion with respect to the supply line 14B is not further described in order to avoid redundant recitation. As seen from FIG. 2, when the powderized material is to be supplied to the mixing chamber in the confluence pipe 16, the gas flow control valve 48 is opened to allow the pressurized gas to flow into the valve unit 23A. In order to introduce a controlled amount of the pressurized gas into the reservoir tank 10A, the valve actuator 108 is operated to open the pressure control valve 28A. As a result, the pressurized gas is introduced into the powderized material reservoir chamber in the tank. At the same time, the feeder motor 102A is driven to drive the rotary feeder 12A to feed a controlled amount of the powderized material. Though the material is fed by the rotary feeder 12A, the supply of the material to the gas/material mixer 46A is blocked by the metering valve 42A. On the other hand, in order to allow flow of the pressurized gas through the supply line 14A, the valve actuator 110 is operated to open the carrier control valve 30 to introduce the pressurized material into the supply line through the gas/powder mixer 46A.

The valve actuator 104A of the metering valve 42A is operated at a controlled timing to meter the powderized material. As the metering valve opens, the material is introduced into the gas/powder mixer 46A to be mixed with the carrier gas. Thus, the powderized material is transferred via the carrier gas through the supply line 14A and introduced into the mixing chamber of the confluence pipe 16.

The mixture of the powderized material and the carrier gas introduced into the mixing chamber is mixed with the other mixture introduced through the supply line 14B to form the mixture to be injected into the container 22 through the injection nozzle 20.

It should be noted that when the powderized material in the reservoir tank 10A is not to be supplied to the mixing chamber in the confluence pipe, the valve actuator 108 is operated to close the pressure valve 28. At the same time, the feeder motor 102A may be stopped and the valve actuator 104A closes the metering valve 42. At this time, the valve actuators 106A and 110A are active to maintain the positions of gas flow control valve 48 and the carrier control valve 30 in such a way that a predetermined pressure of carrier gas flows through the gas/material mixer 46 and the supply line 14A. This prevents the mixture formed in the mixing chamber of the confluence pipe 16 from surging back.

Figure 3:
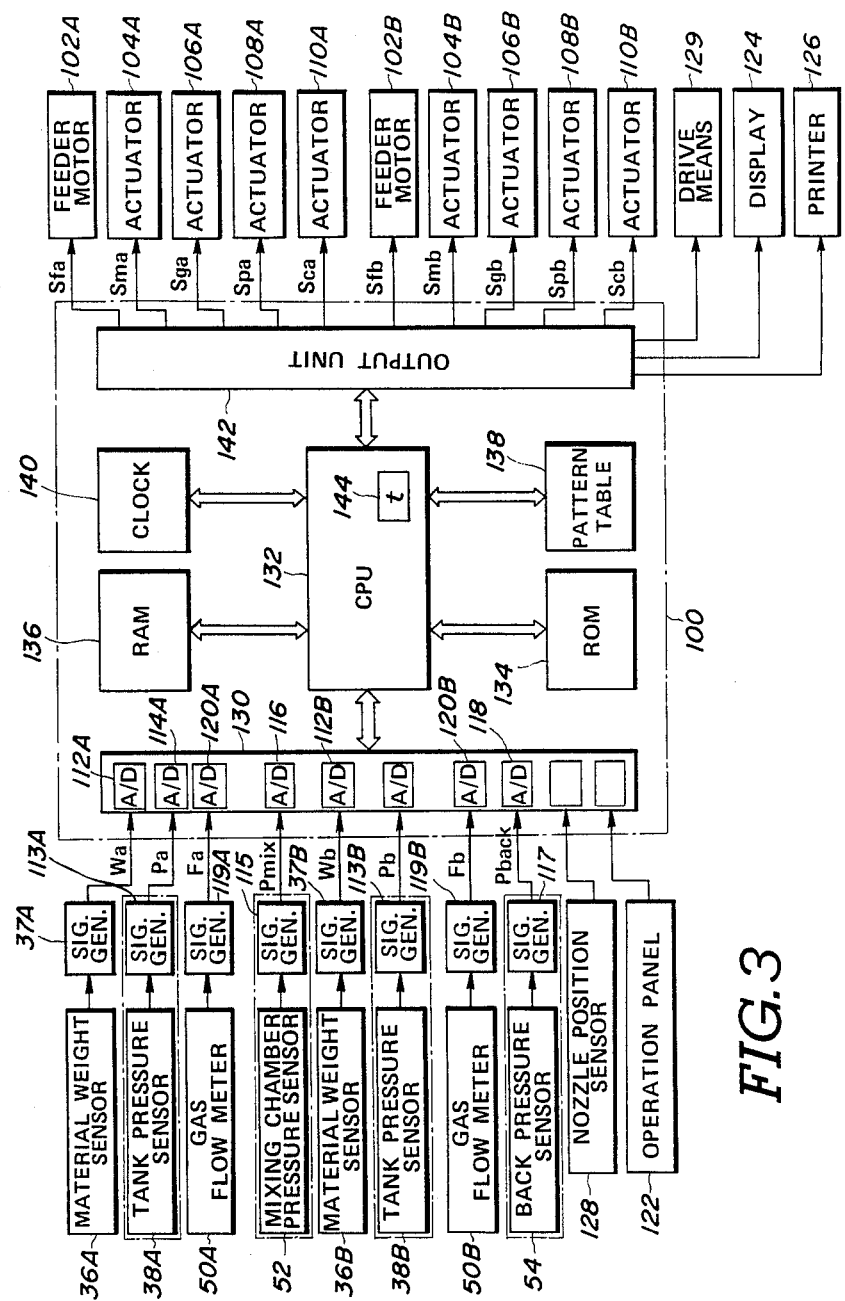
FIG. 3 is a schematic diagram of a control system for controlling operation of the preferred embodiment of the powder state mterial supply system of FIG. 1.

As schematically shown in FIG. 3, the control unit 100 comprises a computer based unit for controlling operation of the powderized material supply system as set forth above. Therefore, the control unit 100 comprises the input unit 130 which performs multiplexing of the input signals from the material weight sensors 36A and 36B, the tank pressure sensors 38A and 38B, the gas flow meters 50A and 50B, the mixing chamber pressure sensor 52 and the back pressure sensor 54. The control unit 100 further comprises a central processing unit (CPU) 132, a read-only-memory (ROM) 134, a random-access-memory (RAM) 136, a pattern table memory 138, a clock generator 140 and an output unit 142. In the preferred embodiment, the pattern table memory 138 stores various preset patterns of gas pressure variations, powderized material supply rates, gas flow rates and so forth. The pattern table in the pattern table memory 138 may be set with respect to each individual tank of powderized material irrespective of the others, or otherwise, can be set in combination with one or more of the others. The pattern table memory 138 can be set in RAM 136 if desired. However, it may be preferable to form the pattern table memory 138 as an external memory utilizing any known memory medium, such as floppy disk, hard disk, magnetic tape, optical disk, semiconductor memory and so forth. Use of the external memory for establishing the pattern table will be convenient in changing operation patterns of the supply system.

In the preferred embodiment, the CPU 132 is selected to perform a plurality of respectively independent functions according to mutually different control loops.

It will be appreciated that the gas flow rate, gas pressure in the supply line and the powderized material supply rate may be feedback controlled utilizing the input signals as feedback control parameters. However, in the preferred embodiment, the input signals i.e. material weight indicative signals $W_a$ and $W_b$, the gas flow rate indicative signals $F_a$ and $F_b$, the tank pressure indicative signals $P_a$ and $P_b$, the mixing chamber pressure indicative signal $P_{mix}$ and the back pressure indicative signal $P_{back}$ are utilized for monitoring operation of the supply system and are not utilized for feedback controlling the supply systems. Therefore, in the preferred process of powderized material supply control according to the preferred embodiment, the rotary feeder motors 102A and 102B, the valve actuators 104A, 104B, 106A, 106B, 108A, 108B, 110A and 110B are controlled by the control unit 100 generally utilizing elapsed process time as a control parameter. Therefore, clock pulses generated by the clock generator 140 are counted by a clock counter 144 in CPU 132. As a consequence, the CPU derives the feeder control signals $S_{fa}$ and $S_{fb}$, the metering control signal $S_{ma}$ and $S_{mb}$, the pressure control signal $S_{pa}$ and $S_{pb}$, the carrier control signal $S_{ca}$ and $S_{cb}$, and the gas flow control signal $S_{ga}$ and $S_{gb}$.

Figure 4:
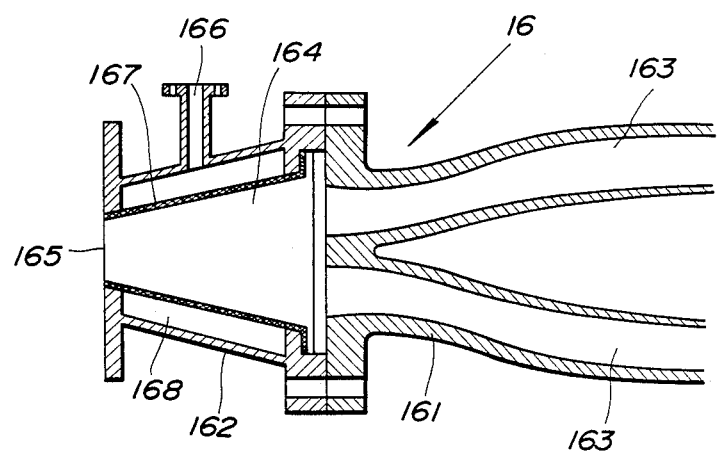
FIG. 4 is a detailed illustration of a confluence pipe to be employed in the preferred embodiment of the powderized material supply system of FIG. 1.

FIG. 4 shows the detailed construction of the confluence pipe 16 to be employed in the preferred embodiment of the powderized material supply system of FIG. 1. As shown FIG. 4, the confluence pipe 16 comprises a branched pipe section 161 and a confluencing section 162. The branched pipe section 161 is provided with a plurality of branch pipes 163 respectively connected to one of the supply lines 14A and 14B. On the other hand, the confluencing section defines therein the mixing chamber 164 into which the mixture of the powderized material and the carrier gas is introduced through the supply lines 14A and 14B and the branch pipes 163. The mixing chamber 164 in the confluencing section 162 is of a basically conical shaped configuration narrowing in the direction of the outlet 165 thereof. The confluencing section 162 is also formed with an air inlet 166 through which pressurized air is introduced into the mixing chamber. Opposing the inner periphery of the confluencing section 162, a meshed partition 167 is disposed to define an annular space 168 between the inner periphery of the confluencing section and the partition. The air introduced into the mixing chamber 164 through the air inlet 166 is at first discharged into the annular space 168 and passes into the mixing chamber through the meshed structure of the partition 167.

The air pressure to be introduced into the mixing chamber 164 is maintained at a positive pressure so that the material introduced into the confluencing section 162 through the branched pipe section 161 will not accumulate within the mixing chamber. Therefore, by introducing the air flow through the air inlet 166, blocking of the confluencing section due to accumulation of the powder state material can be prevented.

In the operation of the aforementioned preferred embodiment of the powderized material supply system, selected materials in a powderized state are put into the reservoir tanks 10A and 10B through the material supply control valves 34A and 34B. During this period, the control unit 100 monitors the material weight indicative signals Wa and Wb to shut the valve when the weight of the material in the reservoir tanks 10A and 10B becomes heavier than or equal to a predetermined weight. Thereafter, the material supply control valves 34A and 34B are closed. The control unit 100 outputs the pressure control signals $S_{pa}$ and $S_{pb}$ to the valve actuators 108A and 108B of the pressure control valves 28A and 28B. Therefore causing, the pressure control valves 28A and 28B to be open. Simultaneously, the control unit 100 outputs the gas flow control signals $S_{ga}$ and $S_{gb}$ to operate the valve actuators 106A and 106B for fully opening the gas flow control valve 48 to introduce the pressurized gas into the reservoir tanks 10A and 10B through the pressure lines 24A and 24B. The control unit 100 monitors the pressure indicative signals $P_a$ and $P_b$ of the tank pressure sensors 38A and 38B. The control unit 100 is responsive to the pressure indicative signals $P_a$ and $P_b$ indicative of pressure being in the reservoir tanks 10A and 10B higher than or equal to a set pressure to stop the pressure control signals $S_{pa}$ and $S_{pb}$ to deactivate the actuators 108A and 108B to close the pressure control valves 28A and 28B.

The control unit 100 maintains the supply system at this stand-by condition until an injection start command $C_{st}$ is input through a keyboard or operation panel 122. The control unit 100 is responsive to the injection start command $C_{st}$ to output the carrier control signals $S_{ca}$ and $S_{cb}$ to operate the actuators 110A and 110B for opening the carrier control valves 30A and 30B. By opening of the carrier control valves 30A and 30B, the pressurized gas is introduced into the supply lines 14A and 14B through the carrier lines 26A and 26B. At the same time, the control unit 100 derives values of the gas flow control signals $S_{ga}$ and $S_{gb}$ so that the gas flow control valves 48A and 48B are operated for allowing a predetermined flow rate of the gas. The control unit 100 monitors the gas flow rate indicative signals $F_a$ and $F_b$ for feedback controlling the gas flow rate through the gas flow control valves 48A and 48B in order to maintain the gas flow rate at the predetermined rate. At this position, the control unit 100 does not output the feeder control signal $S_{fa}$ and $S_{fb}$ and the metering control signals $S_{ma}$ and $S_{mb}$ so as not to supply the powderized materials in the reservoir tanks 10A and 10B to the gas/powder mixers 46A and 46B. As a result, only the carrier gas is introduced into the confluence pipe 16 through the supply lines 14A and 14B.

At this time, the required gas pressure is determined depending upon the pressure necessary for preventing surging at the injection nozzle 22. Assuming the necessary pressure at the injection nozzle 22 is $P_L$, the required pressure $P_{mix}$ in the mixing chamber in the confluence pipe 16 may be illustrated by:

$$P_{mix} = P_L + \Delta P_{Lmix}$$

where $\Delta P_{Lmix}$ is derived in view of a possible maximum pressure loss in the injection line 18 from the confluence pipe 16 to the injection nozzle 22.

Assuming the pressure loss is constant throughout the injection line 18, and assuming the distances from the confluence pipe 16 to the back pressure sensor and from the back pressure sensor to the injection nozzle 20 are respectively $d_1$ and $d_2$, the required pressure $P_{mix}'$ at the back pressure sensor 54 can be illustrated by the following equation:

$$P_{mix}' = P_{mix} - d_1 \times \Delta P_{Lmix}/(d_1 + d_2)$$

The injection nozzle 20 can be inserted into the container 22 when the pressure in the injection line 18 at the back pressure sensor 54 reaches the required pressure $P_{mix}'$. Therefore, the control unit 100 monitors the mixing chamber pressure indicative signal $P_{mix}$ and the back pressure indicative signal $P_{back}$ to output a DOWN signal $S_{down}$ to a drive means 129 (shown in FIG. 3) which drives the injection nozzle 20 downwardly to insert into the container 22, when the mixing chamber pressure $P_{mix}$ and the back pressure $P_{back}$ reach the required values. The operation of the drive means 129 is controlled by the control unit 100 so that the injection nozzle 20 can be positioned in the container 22 at a predetermined depth. For this purpose, the drive means is associated with an injection nozzle position sensor 128. The injection nozzle position sensor 128 monitors the driving magnitude of the drive means 129 and produces a nozzle position indicative signal $N_{pos}$. The control unit 100 receives the nozzle position indicative signal $N_{pos}$ to compare with a reference value $N_{ref}$ which is indicative of the predetermined position of the injection nozzle. The control unit 100 stops the DOWN signal $S_{down}$ when the nozzle position indicative signal value matches the reference value.

After setting the injection nozzle 20 within the container 20, the control unit 100 outputs the feeder control signal $S_{fa}$ and $S_{fb}$ for driving the feeder motor 102A and 102B and the metering control signals $S_{ma}$ and $S_{mb}$ to the actuators 104A and 104B to allow the powderized materials to flow into the supply lines 14A and 14B. After this the flow velocity of the materials, pressure in the supply line and the flow amount of the materials are controlled according to the selected injection pattern.

One of the injection patterns is illustrated in FIGS. 6(A), to 6(D), 7(A) to 7(D) and 8(A) to 8(D). The examples shown herein are directed to injecting post-mixed four materials. Therefore, in order to perform injection, four supply systems, each of which includes material reservoir tank, the valve unit, supply line and so forth as set forth above, are required. For the convenience of the disclosure, the supply system for supplying a powderized material A will be hereafter referred to as "system A", the supply system for supplying a powderized material B will be hereafter referred to "system B", the supply system for supplying a powderized material C will be hereafter referred to as "system C" and the supply system for supplying a powderized material D will be hereafter referred to as "system D".

In FIGS. 6(A) through 6(D), variation patterns of flow velocity of mass flow rate of the materials through the supply lines in the systems A, B, C and D. As will be appreciated herefrom, at the initial stage of injection, the materials A and C are not supplied and only materials B and C are supplied through respective supply lines of the systems B and C at constant higher mass flow rate. At about 8 minutes after starting injection, supply of the materials A and D are started and then the supply amount of the materials B and D are reduced. Therefore, during the first stage, i.e. within about an 8 minute period from starting injection, the materials B and C are introduced into the confluence pipe to be mixed. Therefore, during this period, the mixture of the material B and C is injected into the container. On the other hand, after about 8 minutes from starting, supply of the materials A and D is commenced to reach the predetermined supply rate at about 10 minutes after starting the injection operation and slightly more than 10 minutes after the first injection, the supply rate of the materials B and C becomes lower. During this transition, the proportion of the materials A and D in the mixture is gradually increased. After the supply rates of the materials B and C reaches the lower constant rates, the mixture rate of the materials A, B, C and D in the confluence pipe becomes constant.

During the material supply operation, the pressure in the respective supply lines of the systems A, B, C and D is adjusted as shown in FIGS. 7(A) through 7(D). As will be seen herefrom, the relative pressure in the respective supply lines is kept essentially equal. This is required for keeping the pressure in the confluence pipe equal to the pressure in the supply line to prevent surging. As seen from FIGS. 7(A) through 7(D), the pressure at the initial stage, i.e. about 10 minutes from starting injection, is maintained at higher level and after about 8 minutes it is reduced toward a lower constant pressure which is slightly higher than or equal to the required pressure in the supply lines.

By adjusting the mass flow rate and the pressure in respective supply lines as set forth above, the material supply amount of respective materials A, B, C and D can be controlled as shown in FIGS. 8(A) through 8(D).

As will be appreciated, in order to control the pressures in each supply line and supplying the material into the supply line to prevent surging, the pressure in the carrier line and the pressure in the material reservoir tank should be adjusted by means of the gas flow control valve, the pressure control valve and the carrier control valve. The required pressure $P_i$ in the reservoir tank can be derived from the following equation:

$$P_i = P_{mix} + \Delta P_{mix \cdot i}$$

where $\Delta P_{mix \cdot i}$ is a possible maximum pressure loss through the supply line.

Figure 5:
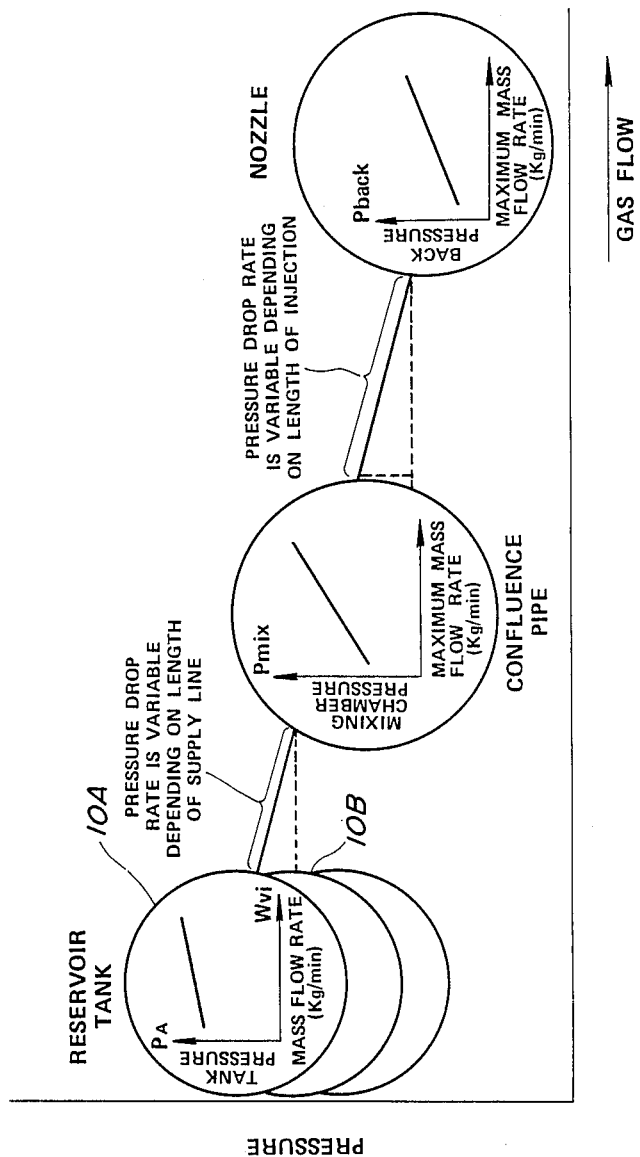
FIG. 5 is a graph showing pressures at various sections of the powder supply line in the preferred embodiment of the supply system of FIG. 1.
Figure 6:
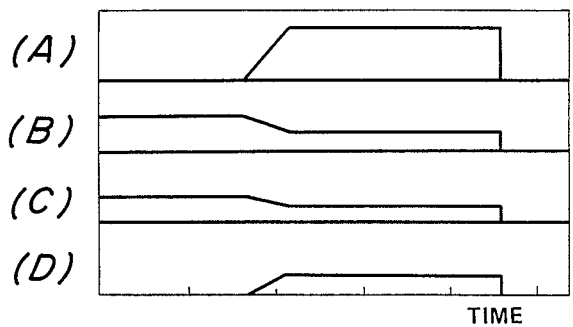
FIG. 6, Parts (A), (B), (C) and (D) are charts showing various preset patterns of supply amounts of powderized material within the carrier gas, when four supply lines are used.
Figure 7:
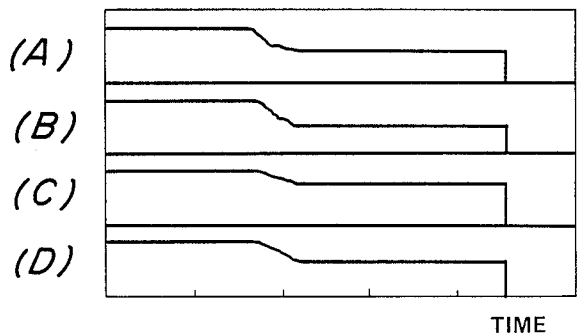
FIG. 7, Parts (A), (B), (C) and (D) are charts showing variations in preset patterns of pressure in a reservoir tank gas, in four supply lines corresponding to the supply lines in FIG. 6, Parts (A), (B), (C) and (D)
Figure 8:
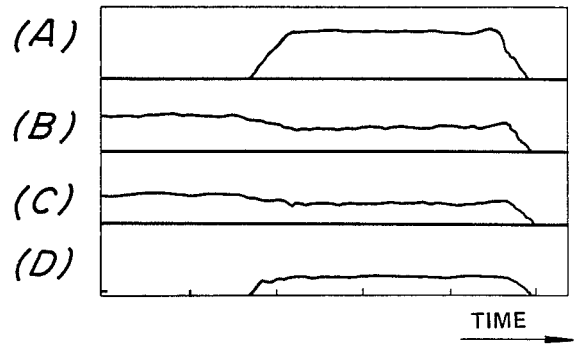
FIG. 8, Parts (A), (B), (C) and (D) are chart showing variations in patterns of actual flow amounts of the powderized material in four supply lines corresponding to the supply lines in FIG. 6, Parts (A), (B), (C) and (D)

The relationship between the pressure in the supply line and the mass flow rate of the material is shown in FIG. 5. Namely, the relationship between maximum mass flow rate $Wv_{total}$ in the confluence pipe and the pressure $P_{mix}$ in the mixing chamber can be seen from FIG. 5. Therefore, based on the maximum mass flow rate $Wv_{total}$ in the confluence pipe, the pressure in the mixing chamber can be assumed. This assumed pressure is assumed as $\widetilde{P}_{mix}$. This assumed pressure $\widetilde{P}_{mix}$ is compared with the required pressure $P_{mix}$ in the mixing chamber as set forth above.

When $P_{mix} - \widetilde{P}_{mix} > \alpha$, the pressure in the mixing chamber is assumed as $P_{mix}$. On the other hand, when $P_{mix} - \widetilde{P}_{mix} \leq \beta$, the pressure in the mixing chamber is assumed as $\widetilde{P}_{mix} + \beta$.

Furthermore, pressure value $P_i$ in each reservoir tank is obtained by substituting the obtained value $P_{mix}$ of the assumed pressure $P_{mix}$ in the confluence pipe pressure in the process. In each reservoir tank, as shown in the graph of FIG. 5, the correlation between the injection rate $Wv_i$ and an injection tank pressure $P_i$ is already known, therefore necessary pressures $P_i$ (i = A, B . . . n) are estimated from this correlation. In this moment, injecting powder rates $Wv_i$ (i = A, B . . . n) in each tank are calculated by maximum rates of each type regarding tank pressures $P_i$. As a result, a pressure $P_i$ in each tank is decided by logics according to the following formulae:

$$P' = \max(P_i, \widetilde{P_i})$$

$$P = \max(P_i')$$

$$\hat{P_i} = P$$

The gas flow velocity $V_i$ of the carrier gas through the supply line is derived from the following equation:

$$V_i = F_i / k \cdot D_i^2 \cdot (\hat{P}_i + 1) \quad (1)$$

where k is a proportion constant and $D_i$ is an internal diameter of the supply line.

Based on the above equation, the solid(S)/gas (G) ratio can be derived from the following equation:

$$S/G_i = Wv_i / (F_i \times \delta) \quad (2)$$

where $\delta$ is a specific gravity of the carrier gas.

Since the minimum flow velocity for carrying the material and the possible maximum S/G ratio are known with respect to each individual material, and assuming the minimum gas flow velocity is $V_{imin}$ and the maximum S/G ratio is $S/G_{imax}$, the required gas flow rate $Fi_1$ can be derived from the foregoing equation (1). Similarly, the required gas flow rate $Fi_2$ can be derived from the foregoing equation (2). Based on derived $Fi_1$ and $Fi_2$, the gas flow rate $F_i$ is set at the value max($Fi_1$, $Fi_2$).

In a similar manner, the gas flow rate $F_{mix}$ and $S/G_{mix}$ are derived for the injection line from the following equations:

$$V_{mix} = F_{mix} / \{k \cdot D_{mix}^2 \cdot (P_{mix} + 1)\}$$

$$S/G_{mix} = Wv_{mix} / (F_{mix} \cdot \delta)$$

where $V_{mix}$ is gas flow velocity in the injection line.

Since the minimum gas flow rate $Fmix_{min}$ and the maximum S/G ratio $S/Gmix_{max}$ can be obtained from the injection speed at the injection nozzle. The required gas flow rate $Fmix_1$ and $Fmix_2$ can be derived in the same manner as set out with respect to the gas low rate $Fi_1$ and $Fi_2$.

Therefore, the required gas flow rate in the injection line can be illustrated by:

$$F_{mix} = \max(F{mix_1}, F{mix_2})$$

Based on the aforementioned processes in deriving the gas pressure to be introduced into respective supply lines 14A and 14B, the gas flow rate and so forth are determined. Furthermore, if necessary, the material supply amount can be feedback controlled on the basis of the differentiated value of material weight in the reservoir tanks 10A and 10B as monitored by the material weight sensor 36A and 36B. Also the gas flow rate and gas pressure through the supply lines 14A and 14B, the confluence pipe 16, the injection line 18 and the pressure in the reservoir tanks 10A and 10B can be feedback controlled on the basis of the mixing chamber pressure indicative signal $P_{mix}$ of the mixing chamber pressure sensor 52, the back pressure indicative signal $P_{back}$ of the back pressure sensor 54, the gas flow rate indicative signals $F_a$ and $F_b$ of the gas flow meters 50A and 50B, and the tank pressure indicative signals $P_a$ and $P_b$ of the tank pressure sensors 38A and 38B.

However, since the approximated value of the material supply amount can be controlled by adjusting number of rotation of the rotary feeders 12A and 12B, the preferred embodiment controls the material supply amount by adjusting number of rotation of the rotary feeder. Furthermore, according to the preferred embodiment, the gas flow rate is preset relative to the mass flow rate of the material and is adjusted in stepwise fashion depending upon the mass flow rate of the material. Also, the preferred embodiment of the material supply system also controls the pressure in the reservoir tanks 10A and 10B, the supply lines 14A and 14B, the confluence pipe 16 and the injection pipe 18 based on the mass flow rate of the material.

Figure 9:
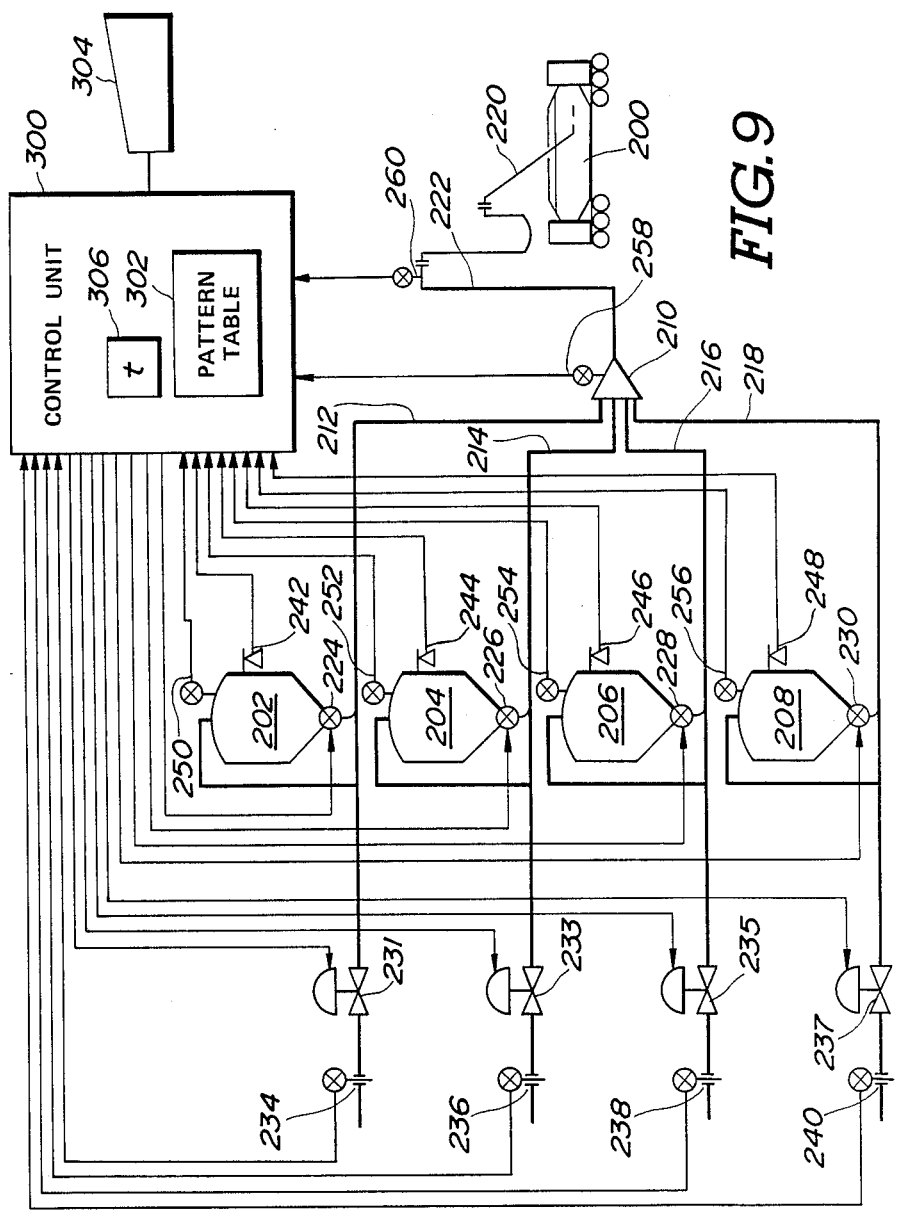
FIG. 9 is a schematic and diagrammatical illustration of the preferred embodiment of a hot metal pre-treatment system utilizing the powderized material supply of FIG. 1.

FIG. 9 schematically shows the practical embodiment of a post-mix flux injection system for hot metal pre-treatment in smelting process. In the shown hot metal pretreatment process, desiliconization, dephosphorization and desulfurization can be performed at a single position of the torpedo car 200. As is well known, the dust (FeO, Fe$_2$O$_3$) and lime are selected as fluxes for desiliconization, the dust, lime flour spar and soda ash are used as fluxes for dephosphorization and lime and soda ash are used as fluxes for desulfurization. Therefore, in order to perform flux injection for hot metal pre-treatment, four reservoir tanks 202, 204, 206 and 208 are required for supplying respective dust, lime, flour spar and soda ash. Respective reservoir tanks 202, 204, 206 and 208 are connected to a confluence pipe 210 through supply lines 212, 214, 216 and 218. The confluence pipe 210 is, in turn, connected to an injection lance 220 through an injection line 222.

Respective reservoir tanks 202, 204, 206 and 208 are associated with flux metering devices 224, 226, 228 and 230. As in the former embodiment, the metering devices comprise rotary feeders associated with a computer based control unit 300 to adjust rotation speed and control the metering amount of the fluxes to be supplied from respectively associated reservoir tanks 202, 204, 206 and 208.

In order to feed the fluxes supplied from respective resevoir tanks 202, 204, 206 and 208 through the metering devices, the supply lines 212, 214, 216 and 218 are connected to pressurized gas source (not shown) through valve units 231, 233, 235 and 237 for introducing controlled flow rate and controlled pressure of carrier gas. The valve units 231, 233, 235 and 237 also connect the pressurized gas source to the reservoir tanks 202, 204, 206 and 208 for adjusting internal pressure in respective reservoir tanks.

As in the former embodiment, the control unit 300 is connected to gas flow sensors 234, 236, 238, 240, the flux weight sensors 242, 244, 246 and 248, such as load cell, the tank pressure sensors 250, 252, 254 and 256, the mixing chamber pressure sensor 258 and the back pressure sensor 260.

The control unit 300 monitors the pressure in the mixing chamber defined within the confluence pipe 210 by monitoring a mixing chamber pressure indicative signal $P_{mix}$ from the mixing chamber pressure sensor 258. The control unit 300 also monitors pressure at the injection lance 220 by monitoring back pressure indicative signal from the back pressure sensor 260. As set forth above, it is possible to perform feedback control for adjusting the carrier gas flow rate and the carrier gas pressure by adjusting path area defined in the valve unit 231, 233, 235 and 237 based on the mixing chamber pressure indicative signal value and the back pressure indicative signal. However, as set forth with respect to the former embodiment, the gas pressure and the carrier gas flow rate are controlled in stepwise fashion in relation to the flux mass flow rate. Therefore, the control unit 300 monitors the mixing chamber pressure and the back pressure for fail-safe purpose to detect abnormality in operation and to produce an alarm.

Figure 10:
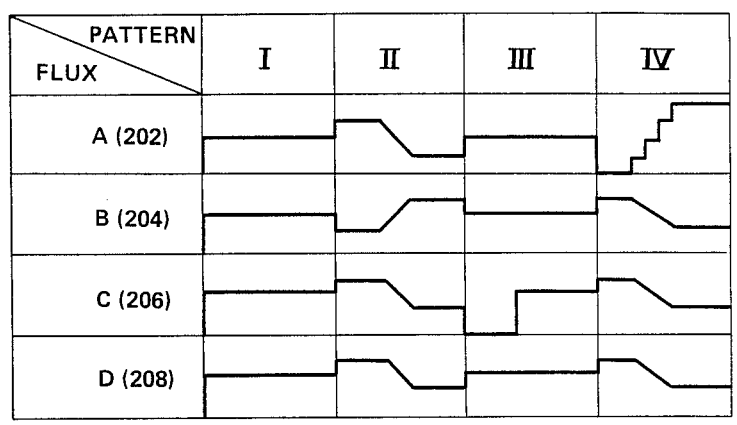
FIG. 10 is an illustration showing various injection patterns stored in a pattern table memory in the control system of FIGS. 1 and 3.
Figure 11:
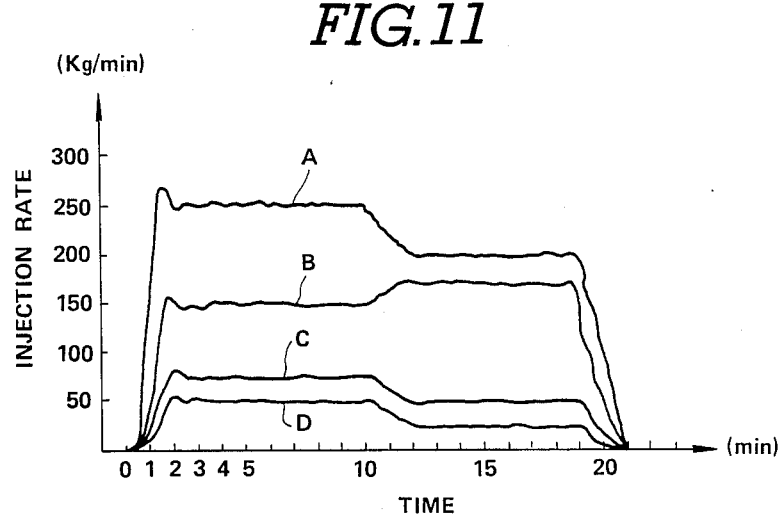
FIG. 11 is a graph showing practical variations of the injection rate of fluxes which are injected utilizing the pattern II in the table of FIG. 10.
Figure 13:
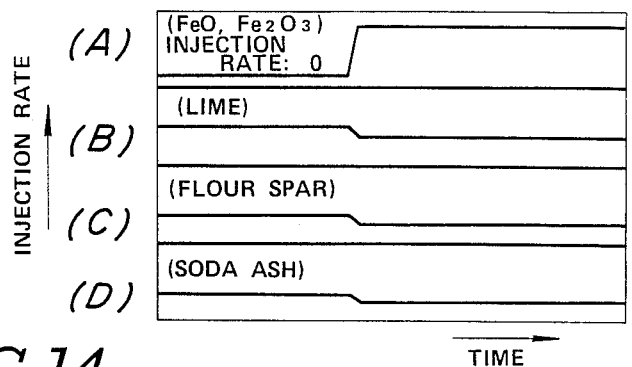
FIG. 13, Parts (A), (B), (C) and (D) show a typical pattern (Pattern 1) of flux injection to be utilized for dephosphorization and desurfurization.
Figure 14:
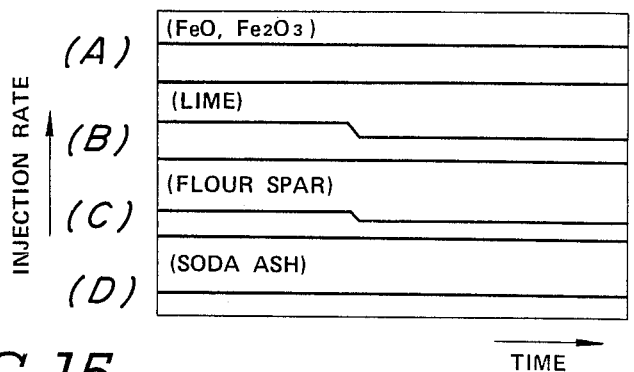
FIG. 14, Parts (A), (B), (C) and (D) show another typical pattern (Pattern 2) of flux injection to be utilized for dephosphorization and desurfurization.

In order to control the metering amount of the fluxes from respective reservoir tanks to establish desired mixture of the fluxes for performing desulfurization, dephosphorization and desurfurization, the control unit 300 is associated with a pattern table 302 which stores various injection patterns. Examples of the injection patterns are shown in FIG. 10. In FIG. 10, the rows A, B, C and D respectively show injection patterns of fluxes from respective reservoir tanks 202, 204, 206 and 208, and the columns I, II, III and IV show combined patterns of flux injection. Namely, when the pattern I is selected, constant rate of fluxes are supplied from respective reservoir tanks. On the other hand, when the pattern II is selected, relatively high rate of fluxes are supplied from the reservoir tanks 202, 206 and 208 and relately low rate of flux is supplied from the reservoir tank 204 after starting injection, the supply rates are reversed after a given period from starting flux injection to supply lower rate of fluxes from the reservoir tanks 202, 206 and 208 and higher rate of flux from the reservoir tank 204. Preactical flux injection rate observed during experimentation in selecting the pattern II is shown in FIG. 11. As will be seen from FIG. 11, the injection rates of respective fluxes could be controlled substantially as set in the pattern table 302. For selecting one of the preset patterns, a control board 304 is connected to the control unit 300. The control board 304 is manually operable for entry of necessary data, such as concentration of Si, P and S in the molten metal, kind of the metal to be produced and so forth, for selecting one of the preset patterns. When the necessary data is input through the control board 304, a selection command is input to the control unit 300.

It should be appreciated that the pattern in the pattern memory will be selected depending upon concentrations in Si, P and S in molten metal and depending upon the kind of the metal to be produced.

FIGS. 12(a), 12(b) and 12(c) are mutually independent control loops to be executed by the control unit 300. As set forth above, since the control unit 300 are designed for executing a plurality of control loops simultaneously in parallel.

FIG. 12(a) shows an operating condition monitoring routine constituting a first independent loop, during the execution of which first loop, the tank pressures in the reservoir tanks are increased by introducing the pressurized gas. In execution, the pressures in respective supply lines 212, 214, 216 and 218, the confluence pipe 210, the injection line 222 are checked at a step 1002. At the step 1002, it is also checked the weight sensors 242, 244, 246 and 248, valve units 231, 233, 235 and 237, flux weight sensors 242, 244, 246 and 248, tank pressure sensors 250, 252, 254 and 256, the mixing chamber pressure sensor 258 and the back pressure sensor 260. The result of checking at the step 1002, is checked at a step 1004. If an abnormal state in any component is detected as checked at the step 1004, an alarm is generated at a step 1006. An alarm of an abnormal condition may include turning ON of a warning lamp, activating a buzzer and so forth.

On the other hand, when no abnormal component is detected as checked at the step 1004, manual operation of an operation start button on a keyboard 304 is checked at a step 1008. The control unit 300 maintains the overall system at the stand-by state until the operation start button is depressed. Therefore, the steps 1002, 1004 and 1008 are repeated until the operation start button is depressed. In response to depression of the operation start button, control signals are produced to introduce the pressurized gas into the reservoir tanks 202, 204, 206 and 208, at a step 1010. During pressurizing the reservoir tanks 202, 204, 206 and 208, the pressure in respective revervoir tanks are displayed on a display (not shown) for visual monitoring of the internal pressure in respective reservoir tanks, at a step 1012. During pressurization of the reservoir tanks 202, 204, 206 and 208, respective tank pressure indicative sensor signals from the tank pressure sensors 250, 252, 254 and 256 are compared with the given pressure indicative value, at a step 1014. As long as any one of the tank pressure indicative sensor signals has a value smaller than the given pressure indicative value, the steps 1012 and 1014 are repeated. When all of the tank pressure indicative sensor signal values becomes greater than or equal to the given pressure indicative value, flux injection is enabled at a step 1016. Thereafter, a check is performed at step 1018 whether an injection start button on the keyboard 304 is depressed. Until the injection start button is depressed, the steps 1016 and 1018 are repeated to maintain the system at an injection stand-by state. When the injection start button is depressed, the operating condition checking routine goes END.

It should be appreciated that the operating condition checking routine will be executed cyclically or repeatedly for continuously checking the operating condition of the system.

FIG. 12(B) shows an injection control routine as the second independent control loop. In execution of the injection control routine, at first, the system condition is checked at a step 1102. Namely, at the step 1102, a check is performed whether the system is in the injection stand-by state or not. In the checking at the step 1102, the main feature to be checked is the pressures in respective flux reservoir tanks, the confluence pipe, the injection line and the lance are checked whether the pressures are higher than respectively given pressures at respective stages. After this, the result of the checking at the step 1102 is checked at a step 1104. If the result shows that the injection stand-by condition has not been established, such as that at least one of the pressures is not at the given pressures, an alarm is generated at a step 1106.

On the other hand, when no component in a abmormal condition is detected as checked at the step 1104, a check is performed whether the injection start button is depressed, at a step 1108. Until the injection start button is depressed, the steps 1102, 1104 and 1108 are repeated. On the other hand, when the depression of the injection start button is detected at the step 1108, control signals to activate the rotary feeders 224, 226, 228 and 230 to perform flux injection according to the preset pattern, at a step 1110.

In the process of step 1110, the control unit reads out the preset injection data from the pattern table in terms of an elapsed time from starting injection. Namely, the control unit 300 derives injection rates of agents in respective tanks according to the injection data read out from the pattern table 302. Based on the derived agent injection rates, the control unit 300 outputs the feeder control signals for adjusting metering amount of the agents in respective reservoir tanks. During the aforementioned process at the step 1110, the derived data is displayed on the display for visual information.

After the step 1110, a check is made whether the flux injection has to be stopped or not, at a step 1112. In practice, the flux injection is stopped when the full amount of agents are injected or a stop button on the keyboard 304 is depressed. When the flux injection stop condition is established, as checked at the step 1112, program execution goes end.

On the other hand, when the flux injection stop condition is not established as checked at the step 1112, the process returns to the step 1110. When the process returns to the step 1110, the control unit 300 once again accesses the pattern table 302 to read out the injection data in terms of the instantaneous elapsed time from starting injection.

Therefore, by repeating the steps 1110 and 1112, flux injection is performed with varying injection rates of respective agents in respective reservoir tanks, from time to time, according the preset pattern, such as that shown in FIGS. 10 and 11.

FIG. 12(c) shows a pattern setting routine as the third independent control loop. The pattern selection is performed through the keyboard 304. Therefore, the patern setting routine is triggered in response to a pattern setting command entered through the keyboard 304. When the pattern setting command is detected, a step 1202 is executed to accept pattern selection command. In the process of the step 1202, the injection data to be used in the flux injection is updated.

It should be preferable to accept updating of the injection data even during operation of flux injection. Therefore, according to the preferred embodiment, when pattern selection command is entered after starting flux injection, the control unit 300 will allow updating of the injection data at the portion of the pattern later than the instantaneous time. Namely, since each pattern data in the pattern table is preset with associated injection time data. Therefore, assuming the pattern selection command in order to select the pattern II of FIG. 10 is entered after 5 minutes of starting flux injection according to the previously selected pattern III of FIG. 10, the running pattern of pattern III is replaced with the portion of the pattern II after 5 minutes from starting injection.

In order to enable the aforementioned pattern selection during flux injection, the selected pattern may be displayed on the display with indication of the elapsed time. Therefore, the operator may select the desired pattern in view of the pattern to be replaced with by observing the display monitor.

According to the shown process, since the flux composition in the mixture to be injected into the torpedo car can be adjusted at any rate, desulfurization, dephosphorization and desurfurization can be performed at a single position and sequentially. This reduces the occurence of the necessity of removal of slag and driving the torpedo car to desiliconizing dephosphorizing or desulfurizing positions. Therefore, by the shown embodiment, the operation period of the hot metal pre-treatment can be shortened and simplified.

Figure 15:
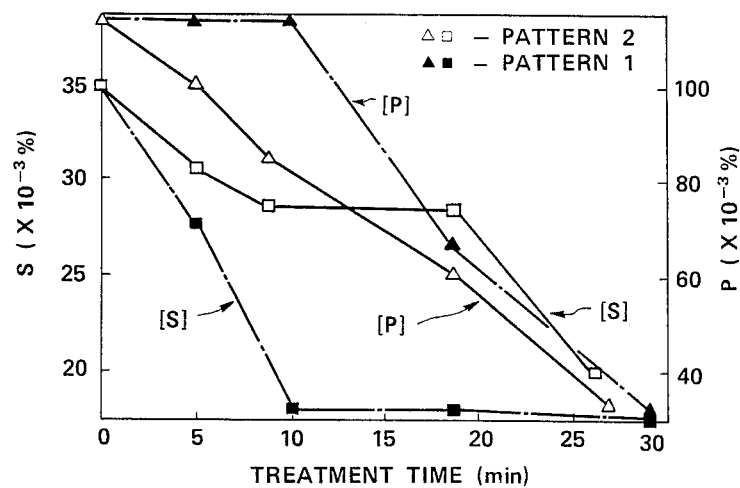
FIG. 15 is a graph showing variation of concentration of P and S during dephosphorization and desurfurization.

In order to prove the performance of the shown embodiment of the hot metal pre-treatment system, experimental flux injections have been taken for dephosphorization and desulfurization. The flux injection patterns shown in FIGS. 13(A) through 13(D), 14(A) through 14(D) are selected for performing the experiments. During experimentation the phosphor concentration and sulfur concentration have been monitored. The monitored concentrations of the phosphor and sulfur are shown in FIG. 15. As will be seen from FIG. 15, it will be made clear that the preferred and practical embodiment of the hot metal pre-treatment system is satisfactorily effective.

Therefore, as will be appreciated herefrom, the present invention fulfills all of the objects and adtanvantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A system for supplying a plurality of mutually different powder state materials at controlled supply rate in post-mixed form, comprising:
   a plurality of tanks, each being filled with one of said powder state materials;
   a metering means, associated with each of said tanks, for metering powder state material to supply a controlled amount of the materials;
   a feeding means, including a plurality of supply lines, each of which is associated with one of said tanks for feeding said metered material from the associated tank by means of carrier fluid flowing therethrough;
   a confluencing means, connected to respective supply lines, for receiving materials fed through respective supply lines in order to establish a mixture of said materials;
   a discharge means, connected to said confluencing means, for discharging said said mixture established in said confluencing means with a given discharge pressure; and
   a control means, associated with said metering means, for controlling operation of said metering means to adjust amounts of respective materials to be contained in said mixture established by said confluencing means at given values, and for controlling said given discharge pressure.

2. The system as set forth in claim 1, wherein said control means controls said metering means for varying supply rate of the material in associated tank according to a preset variation pattern which determines the material supply rate variable according to operation period.

3. The system as set forth in claim 2, wherein said control means controls said feeding means to vary said carrier fluid pressure according to a mass flow rate of said mixture to be discharged through said discharge means.

4. The system as set forth in claim 3, which further comprises means for introducing a pressurized fluid into respective tanks to maintain internal pressures in repective tanks at a given pressure, and tank pressure sensors, each associated with one of said tanks for monitoring internal pressure in the associated tank for producing a tank pressure indicative signal, and said control means is associated with said pressurized fluid introducing means for controlling tank pressure on the basis of said tank pressure indicative signal.

5. The system as set forth in claim 4, wherein said control means derives required tank pressure on the basis of the required mass flow rate of said material in each tank to control said pressurized fluid introducing means to adjust said internal pressure in each tank toward said required pressure.

6. The system as set forth in claim 4, wherein said pressurized fluid introducing means and said feeding means are connected to a common pressurized fluid source.

7. The system as set forth in claim 1, wherein said metering means comprises a plurality of rotary feeders, each associated with one of said tanks for metering controlled amount of material in the associated tank, and said control means is adapted to control respective rotary feeders for adjusting the material supply rate independently of each other.

8. The system as set forth in claim 1, wherein said control means comprises a computer based controller including a memory means for storing a plurality of mutually distinct variation patterns and a manual selector means for manually selecting one of material injection patterns.

9. The system as set forth in claim 8, wherein said memory stores combined variation patterns for respective materials so that variation patterns for all of materials can be selected through said manual selector means by identifying one of combined pattern.

10. The system as set forth in claim 8, wherein said metering means comprises a plurality of rotary feeders, each associated with one of said tanks for metering a controlled amount of material in the associated tank, and said control means is adapted to control rotation speed of respective rotary feeders for adjusting the material supply rate according to selected one of variation patterns.

11. The system as set forth in claim 1, wherein said confluencing means comprises a confluence pipe defining a mixing chamber therein and having a plurality of branched pipes respectively connected to said supply lines for introducing materials fed through said supply lines with said carrier fluid into said mixing chamber for establishing said mixture.

12. The system as set forth in claim 11, wherein said confluence pipe further comprises means for introducing a pressurized gas in substantially perpendicular to flow direction of said materials as carried by said carrier fluid.

13. The system as set forth in claim 12, wherein said confluence pipe further comprises a cylindirical partition disposed within said mixing chamber to define a substantially annular chamber around said mixing chamber, said partition being formed with a plurality of apertures establishing gas communication between said mixing chamber and said annular chamber, and said pressurized gas is discharged into said annular chamber and blown into said mixing chamber through said apertures formed in said partition.

14. The system as set forth as set forth in claim 13, wherein the pressure of said pressurized gas to be introduced into said mixing chamber is adjusted to be slightly higher than the pressure in said mixing chamber.

15. The system as set forth in claim 1, further comprising means for introducing carrier fluid into said fluid means, and wherein said control means controls pressure of said carrier fluid to be introduced into said feeding means based on said given discharge pressure.

16. A system for supplying a plurality of mutually different fluxes to be utilized for hot metal pre-treatment in a smelting process, in a post-mixed form, comprising:
   a plurality of tanks, each being filled with one of said powder state fluxes;
   a metering means, associated with each of said tanks, for metering powder state flux to supply a controlled amount of the fluxes;
   a feeding means, including a plurality of supply lines, each of which is associated with one of said tanks for feeding said metered flux from the associated tank by means of carrier fluid flowing therethrough;
   a confluencing means, connected to respective supply lines, for receiving fluxes fed through respective supply lines in order to establish a mixture of said fluxes;
   a discharge means, connected to said confluencing means, for discharging said mixture established in said confluencing means, into a molten metal in a hot metal container with a given discharge pressure; and
   a control means, associated with said metering means, for controlling operation of said metering means to adjust amounts of respective fluxes to be contained in said mixture established by said confluencing means at given values, and for controlling said given discharge pressure.

17. The system as set forth in claim 16, wherein said hot metal container is a torpedo car.

18. The system as set forth in claim 16, wherein said fluxes filled in said tanks are forms at least two of desiliconization mixture, dephosphorization mixture and desulfurization mixture.

19. The system as set forth in claim 16, wherein said discharge means comprises an injection lance to be inserted into said hot metal and an injection line connecting said injection lance to said confluencing means.

20. The system as set forth in claim 16, wherein said control means controls said metering means for varying supply rate of the flux in associated tank according to a preset variation pattern which determines the flux supply rate variable according to operation period.

21. The system as set forth in claim 20, wherein said control means controls said feeding means to vary said carrier fluid pressure according to a mass flow rate of said mixture to be discharged through said discharge means.

22. The system as set forth in claim 21, which further comprises means for introducing a pressurized fluid into respective tanks to maintain internal pressures in repective tanks at a given pressure, and tank pressure sensors, each associated with one of said tanks for monitoring internal pressure in the associated tank for producing a tank pressure indicative signal, and said control means is associated with said pressurized fluid intorducing means for controlling tank pressure on the basis of said tank pressure indicative signal.

23. The system as set forth in claim 22, wherein said control means derives required tank pressure on the basis of the required mass flow rate of said material in each tank to control said pressurized fluid introducing means to adjust said internal pressure in each tank toward said required pressure.

24. The system as set forth in claim 23, wherein said pressurized fluid introducing means and said feeding means are connected to a common pressurized fluid source.

25. The system as set forth in claim 16, wherein said metering means comprises a plurality of rotary feeders, each associated with one of said tanks for metering a controlled amount of flux in the associated tank, and said control means is adapted to control respective rotary feeders for adjusting the flux supply rate independently of each other.

26. The system as set forth in claim 16, wherein said control means comprises a computer based controller including a memory storing a plurality of mutually distinct variation patterns and a manual selector means for manually selecting one of variation patterns.

27. The system as set forth in claim 26, wherein said memory stores combined variation patterns for respective fluxes so that variation patterns for all of fluxes can be selected through said manual selector means by identifying one of combined pattern.

28. The system as set forth in claim 26, wherein said metering means comprises a plurality of rotary feeders, each associated with one of said tanks for metering a controlled amount of flux in the associated tank, and said control means is adapted to control rotation speed of respective rotary feeders for adjusting the flux supply rate according to selected one of variation patterns.

29. A method for supplying a plurality of mutually different powder state materials at controlled supply rate in post-mixed form, comprising the steps of:
   metering a mutually different powder state materials from a plurality of mutually different sources to supply a controlled amount of the materials;
   feeding said metered material from said sources by means of carrier fluid flowing through mutually independent supply lines;
   forming a mixture of materials fed through said supply lines;
   discharging said mixture with a given discharge pressure; and
   controlling said metering amounts of respective materials to be contained in said mixture in order to adjust mixture rates of respective materials according to a preset variation pattern in realtion to operation period, and for controlling carrier fluid pressure to be introduced into said supply lines based on said given discharge pressure.

30. The method as set forth in claim 29, wherein said carrier fluid pressure is adjusted according to a mass flow rate of said mixture.

31. The method as set forth in claim 30, which further comprises the step of adjusting pressure in said sources to maintain pressure to be exerted on said materials at given pressures.

32. The method set forth in claim 31, which further comprises the step of determining said pressures in respective sources on the basis of the required mass flow rate of said materials.

33. The method as set forth in claim 29, which further comprises the step of adjusting said metering amount by means of rotary feeders cooperating with respective sources, and by adjusting rotation speed and/or number of rotational cycle of said rotary feeders.

34. The method as set forth in claim 29, which further comprises the steps of presetting a plurality of mutually distinct variation patterns of mixture rate of each material in said mixture, and selecting one of said preset variation patterns.

35. The method as set forth in claim 29, which further comprising the steps of providing a confluence pipe defining a mixing chamber therein and having a plurality of branched pipes respectively connected to said supply lines for introducing materials fed through said supply lines with said carrier fluid into said mixing chamber for establishing said mixture, and introducing a pressurized gas in substantially perpendicular to flow direction of said materials as carried by said carrier fluid.

36. The method as set forth in claim 35, which further comprises the step of adjusting the pressure of said pressurized gas to be introduced into said mixing chamber to be slightly higher than the pressure in said mixing chamber.

37. The method as set forth in claim 29, wherein said powder state material are fluxes, and wherein said fluxes are forms of at least two of a desiliconization mixture, a dephosphorization mixture and a desulfurization mixture.

* * * * *